United States Patent Office 2,908,293
Patented Oct. 13, 1959

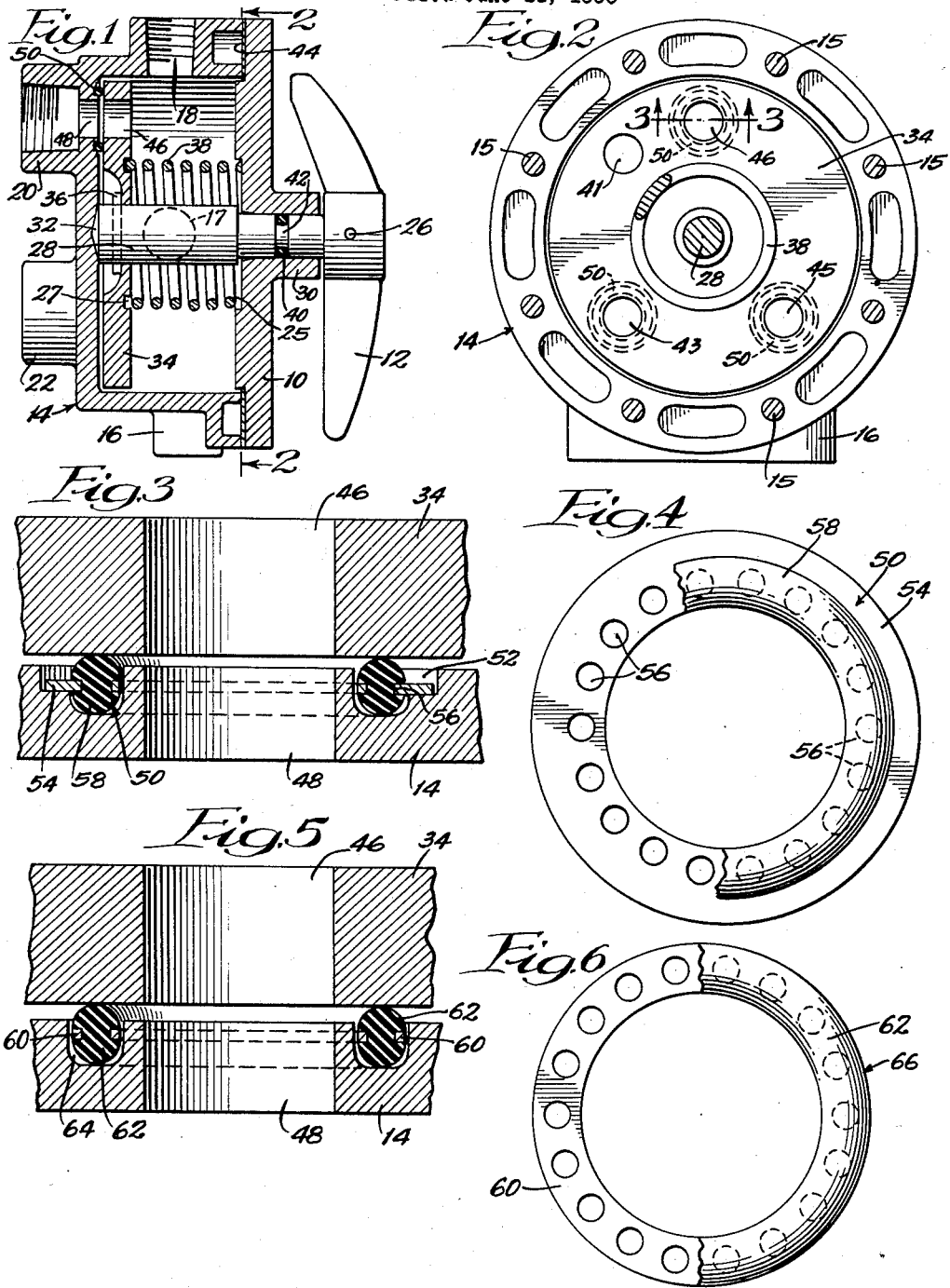

2,908,293
ROTARY DISK VALVE HAVING A REINFORCED O-RING SEAL

Alsin Kenneth Johnson, Madrid, Iowa, assignor to Delavan Manufacturing Company, West Des Moines, Iowa, a corporation of Iowa Application June 11, 1956, Serial No. 590,516

2 Claims. (Cl. 137—625.46)

This invention relates to improvements in valve construction and more particularly to such improvements adapted to provide a tight seal and prevent leakage in valves of the slide or disk type.

Valves are known in the prior art in which control of fluid flow through one or more outlets in a housing is provided by means of a valve member slidably associated with the wall of the housing in which the outlets are located. The problem of maintaining a leakproof seal between the slidable valve member and the housing in valves of this type is a serious one for which the various solutions taught by the prior art have not proved entirely satisfactory.

The primary object of this invention is to provide an improved construction for a valve of the type having a slidable valve member.

Another object is to provide in valves of the above type an improved construction for insuring a leak tight seal between the slidable valve member and the valve housing upon which it slides.

Still another object of the invention is to provide a positive long life seal for a valve.

A further object of this invention is to provide an efficient, reliable yet inexpensive construction for an improved leakproof valve of the slide or disk type.

These and other objects are realized in a specific illustrative embodiment of the invention which comprises a valve housing having at least one inlet for fluids at a side thereof and a plurality of outlets disposed in an end wall thereof. A rotatable control disk having a plurality of discharge apertures therein is positioned between the fluid inlet and the end wall such that the fluid may be made to flow through any single outlet or combination of outlets, as desired, by rotation of the control disk so as to align the discharge apertures therein with the proper one or ones of the outlets. In accordance with features of this invention the control disk provides positive shut-off of fluid flow with no leakage by means of annular grooved seats around each of the discharge apertures in the face of the control disk which abuts the end wall. A sealing ring of deformable material such as rubber is adapted to fit in each of these annular grooved seats such that a leaktight seal is provided around the fluid passageway defined by the control disk aperture and wall outlet at their junction.

It will be appreciated, however, that the sliding action of the control disk on the end wall, as the former is rotated, subjects each sealing ring to lateral thrust or pressure which tends not only to distort the ring but additionally to dislodge it from its grooved seat and thereby cause the leaktight seal to be destroyed.

In accordance with further features of this invention, this undesirable tendency is eliminated by reinforcing the sealing rings to render them sufficiently rigid to resist distortions when the disk is rotated while at the same time retaining their deformable characteristics to maintain the desired sealing qualities.

The above and other features of novelty which characterize the invention are pointed out with particularity in the claims annexed to and forming a part of this specification. For a better understanding of this invention, however, its advantages and specific objects attained with its use, reference is had to the accompanying drawing and descriptive matter in which is shown and described an illustrative embodiment of the invention.

In the drawing:

Figure 1 is a side elevational view in cross section of a multioutlet valve embodying the invention;

Figure 2 is an elevational view taken on line 2—2 of Figure 1;

Figure 3 is a cross sectional view taken on line 3—3 of Figure 2 showing one embodiment of reinforced sealing and seat therefor in accordance with the invention;

Figure 4 is a view partly in section of the reinforced sealing ring embodiment shown in Figure 3;

Figure 5 is a cross section of a sealing ring and seat therefor in accordance with another embodiment of the invention; and Figure 6 is a view partly in section of the reinforced sealing ring shown in Figure 5.

Referring now to the drawing, the illustrative embodiment of the invention shown therein comprises a multi-outlet valve wherein fluid supplied to the valve through an inlet disposed in one wall thereof may be selectively discharged through one or more outlets by means of a rotatable control disk. The valve includes a housing formed of a cover plate 10, which advantageously may be made of die cast aluminum and have indexed on the front thereof the various operating positions of the valve for ready alignment with a dial handle 12. Cover plate 10 is secured to valve body 14, which also may advantageously be formed of die cast aluminum, by means of a plurality of end plate screws (not shown) through a number of radially spaced openings in cover plate 10 and threaded into an equal number of similarly spaced threaded apertures 15 located in the face of valve body 14.

Valve body 14 has a pair of openings, one on each side wall of the valve, such as opening 17 shown in dotted line form in Figure 1. One opening of this pair is adapted to be connected to a source of fluid and thus preferably is internally threaded to facilitate connection of the valve to various types of fittings, tubing adapters, hoses and the like. The other opening is disposed opposite the first opening and is used as a by-pass; advantageously this opening also is internally threaded to permit connection to suitable by-pass lines. It is contemplated that the inlet and by-pass openings may be functionally interchanged and thus inlet and by-pass lines may be installed on either side of valve body 14.

A further threaded opening 18 is provided at the upper wall of valve body 14 to facilitate connection of suitable pressure gauges to the valve. A mounting base 16 also is provided at the lower wall of valve body 14 so that the valve may easily be mounted on spraying rigs and the like by means of suitable cap screws threaded into the mounting base.

Valve body 14 has at the rear wall thereof a plurality of outlets such as outlets 20, 22 and 24 (not shown). In accordance with this specific embodiment of the invention these outlets are disposed in the rear wall of valve body 14 at an equal distance from the center of the rear wall for operative alignment with the control disk as explained in greater detail below.

Dial handle 12 is connected by means of pin 26 to control shaft 28 journalled within a hub 30 of cover plate 10 and rotatable in a shaped recess 32 provided at the center of the inner rear wall of valve body 14. A control disk 34 is secured to shaft 28 in substantial abutting relation with the inner rear wall of valve body 14 by means of roll pin 36 positioned in a suitable aperture provided in shaft 28.

Control disk 34 is urged against the inner rear wall of valve body 14 by a helical coil spring 38 disposed around control shaft 28 and seated at one end thereof in an annular groove 25 provided in cover plate 10 and at the other end thereof in an annular groove 27 provided in control disk 34.

It will be appreciated that in the operation of the valve it is desirable that fluids supplied through inlet 17 be permitted to be discharged from the valve through only the selected one or ones of outlets 20, 22 and 24. This desirable result is achieved in accordance with the invention by means of a unique arrangement of apertures 41, 43, 45, and 46 disposed in control disk 34. It will be appreciated that in the arrangement shown in Figure 2 each of these apertures is equally spaced from the center of control disk 34 and as such is adapted to cooperate with the equally spaced outlets 20, 22 and 24 radially disposed in the rear wall of valve body 14. With the particular arrangement shown in Figure 2, fluid supplied to the valve through inlet 17 may be selectively discharged from any one of outlets 20, 22, or 24 or any combination of the same merely by rotating dial handle 12 so as to properly align apertures 41, 43, 45 and 46 of control disk 34 with the selected outlets. It further will be appreciated that numerous other arrangements of control disk apertures and outlets may be devised in accordance with the above principles to provide any desired discharge control for the multioutlet valve.

Fluid leakage is prevented from taking place through hub 36 by means of a sealing ring 40 disposed about a groove 42 provided in shaft 28. Leakage further is prevented by the provision of a sealing gasket 44 disposed between cover plate 10 and valve body 14.

In accordance with an important aspect of this invention leakage is prevented at the discharge outlets defined by the apertures in control disk 34 and the discharge apertures 48 associated with outlets 20, 22 and 24 in the rear wall of valve body 14 by means of reinforced sealing rings 50 or 66 disposed in suitably grooved seats positioned about discharge apertures 48. It will be appreciated that due to the sliding thrust placed upon the sealing rings by the rotation of control disk 34 each sealing ring is subjected to lateral pressures which tend not only to distort the ring but also to dislodge it from its grooved seat and thereby cause the leaktight seal to be destroyed. In accordance with this invention this tendency is eliminated by the provision of sealing rings which are made sufficiently rigid to resist distortions and dislodgment when the control disk is rotated thereon but which at the same time retain their deformable characteristics to maintain the desired sealing qualities.

One embodiment of this novel sealing ring is shown in Figures 3 and 4 of the drawing. Ring 50 is placed in a suitable grooved seat 52 provided in the rear wall of valve body 14 about discharge outlet 48. Ring 50 advantageously comprises an annular metal reinforcing disk 54 which has a plurality of apertures 56 equally spaced therearound. A seal 58 of resilient material such as rubber is disposed on each face of disk 54, the disk having a greater diameter than the rubber seal so as to provide an annular flange extending outwardly therefrom. Apertures 56 in disk 54 are provided to eliminate the difficulty encountered in trying to bond rubber to metal. Thus apertures 56 make is possible to mold rubber seal 58 on both sides of disk 54 in one continuous piece as a result of the rubber to rubber bond provided through apertures 56.

Sealing ring 50 when utilized between control disk 34 and valve body 14 in the grooved seat 52 provided therefor as shown in Figure 3 provides a leaktight seal for the fluid passing through discharge apertures 46 and 48. Further, due to the reinforcement provided by metal disk 54, sealing ring 50 successfully eliminates the tendency of the sealing ring to roll out of its retaining groove when sliding pressure is applied across its face by the rotation of control disk 34.

Figures 5 and 6 illustrate a modification of the sealing ring shown in Figures 3 and 4. In this modification metal disk 60 has the same diameter as the rubber seal 62 molded on each side thereof. Thus, this embodiment of reinforced sealing ring is designed to be used with a multioutlet valve of the type wherein the grooved retaining seat 64 in valve body 14 is formed without a flange and therefore is substantially of the same width as sealing ring 66.

While several embodiments of the invention have been described in detail for the purpose of teaching the principles of the invention it will be understood by those skilled in the art that these embodiments are illustrative only and are not to be taken as a definition of the scope of the invention, reference being had for this purpose to the appended claims.

What is claimed is:

1. In a multioutlet valve of the type including a housing, an inlet in said housing for enabling liquids to flow therein, a plurality of outlets in an end wall of said housing for enabling the liquids to be discharged to desired receiving and utilization devices, a rotatable control disk having a plurality of apertures therein arranged in a predetermined pattern, said control disk being disposed between said inlet and said end wall, spring means in said housing biasing said control disk into abutting relation with said outlets, and means for rotating said control disk for selectively aligning said apertures with said outlets to permit liquids in said housing to be discharged in a desired manner therethrough, the improvement of means for preventing leakage of said liquids from said apertures including a flanged annular seat around each of said outlets on the inner face of said end wall, and a deformable sealing ring adapted to fit within said flanged annular seat, said sealing ring having reinforcing means incorporated therein for imparting sufficient rigidity to said sealing ring to resist distortion due to the lateral pressure applied to said sealing ring when the spring biased disk is rotated in said housing, said reinforcing means comprising a metal disk having a diameter substantially equal to that of said flanged annular seat.

2. A valve comprising the combination of a substantially cylindrical housing, at least one inlet in said housing for enabling liquids to flow therein, a plurality of outlets in an end wall of said housing for enabling the liquids to be discharged to desired receiving and utilization devices, a rotatable control disk having at least one aperture therein disposed between said inlet and said end wall, spring means disposed between a wall of said housing and said control disk for urging the latter into abutting relation with said end wall, means for selectively rotating said control disk for permitting liquids in said housing to be selectively discharged through desired ones of said outlets, a grooved seat around each of said outlets and means for preventing leakage of liquids from said outlets comprising a deformable sealing ring adapted to fit within each grooved seat, said sealing ring including a rigid disk having a plurality of apertures formed therein and resilient sealing means disposed on each side of said disk and through the apertures therein to form an integrally molded unit, whereby said sealing ring is adapted to resist the lateral thrust created by the rotation of the spring urged control disk in said housing.

References Cited in the file of this patent

UNITED STATES PATENTS

| | | |
|---|---|---|
| 1,133,853 | Gold | Mar. 30, 1915 |
| 2,156,967 | Brosius | May 2, 1939 |
| 2,290,349 | Ohls | July 21, 1942 |
| 2,310,583 | Johnson | Feb. 9, 1943 |
| 2,484,102 | Le Valley | Oct. 11, 1949 |
| 2,621,888 | Allen | Dec. 16, 1952 |
| 2,633,325 | Whitlock | Mar. 31, 1953 |
| 2,717,793 | Nenzell | Sept. 13, 1955 |